(12) United States Patent
Barretto et al.

(10) Patent No.: US 10,605,361 B2
(45) Date of Patent: Mar. 31, 2020

(54) SYSTEM FOR CONTROLLING THE TORSIONAL OUTPUT OF A HYDROSTATIC TRANSMISSION OF A WORK VEHICLE

(71) Applicant: CNH Industrial America LLC, New Holland, PA (US)

(72) Inventors: Mauro de Azevedo Barretto, Cotia (BR); Murilo Martinho de Oliveira, Curitiba (BR); Paulo Jose de Andrade Alves, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 18 days.

(21) Appl. No.: 16/119,075

(22) Filed: Aug. 31, 2018

(65) Prior Publication Data

US 2020/0072349 A1 Mar. 5, 2020

(51) Int. Cl.
*F16H 61/456* (2010.01)
*F16H 61/4043* (2010.01)
*F16H 39/02* (2006.01)
*B60K 17/10* (2006.01)

(52) U.S. Cl.
CPC ......... *F16H 61/456* (2013.01); *B60K 17/105* (2013.01); *F16H 39/02* (2013.01); *F16H 61/4043* (2013.01)

(58) Field of Classification Search
CPC ....... F16H 61/456; F16H 61/444; F16H 61/44
See application file for complete search history.

(56) References Cited

U.S. PATENT DOCUMENTS

| | | | | |
|---|---|---|---|---|
| 4,261,431 A | * | 4/1981 | Hawbaker | B62D 11/183 180/6.48 |
| 4,769,991 A | * | 9/1988 | Johnson | E02F 9/2253 180/6.48 |
| 5,857,330 A | * | 1/1999 | Ishizaki | E02F 9/2225 60/426 |
| 6,675,575 B1 | * | 1/2004 | Cunningham | F16H 61/444 180/242 |
| 7,631,951 B2 | * | 12/2009 | Link | B60K 28/16 303/113.2 |
| 8,333,069 B2 | * | 12/2012 | Heren | B60K 17/10 180/242 |

(Continued)

FOREIGN PATENT DOCUMENTS

DE  102008038382 A1  2/2010

*Primary Examiner* — Thomas E Lazo
(74) *Attorney, Agent, or Firm* — Patrick M. Sheldrake; Peter K. Zacharias

(57) ABSTRACT

In one aspect, a system for controlling the torsional output of a hydrostatic transmission of a work vehicle may include pilot-operated first and second valves. The first valve configured to be actuated to a closed position to occlude fluid flow through a first fluid conduit when a pressure within such conduit at a location downstream of the first valve drops below a first threshold. Moreover, the second valve configured to be actuated to a closed position to occlude fluid flow when a pressure within the second fluid conduit at a location downstream of the second valve drops below a second threshold. As such, when one of the first or second valves is actuated to the closed position, an increased flow of fluid is delivered through the other of the first valve or the second valve to increase a torsional output of an associated hydraulic motor.

19 Claims, 4 Drawing Sheets

(56) References Cited

U.S. PATENT DOCUMENTS

| | | | |
|---|---|---|---|
| 8,387,377 B2* | 3/2013 | Loewe | B60K 17/10 |
| | | | 180/308 |
| 9,416,871 B1* | 8/2016 | Bonny | F16H 61/44 |
| 2008/0184703 A1 | 8/2008 | Gerth et al. | |
| 2015/0020515 A1* | 1/2015 | Dostal | E02F 9/2253 |
| | | | 60/420 |
| 2015/0233094 A1 | 8/2015 | Maiyur | |
| 2016/0230370 A1 | 8/2016 | Fukuda et al. | |
| 2016/0341308 A1 | 11/2016 | Rathke | |

* cited by examiner

SYSTEM FOR CONTROLLING THE TORSIONAL OUTPUT OF A HYDROSTATIC TRANSMISSION OF A WORK VEHICLE

FIELD

The present disclosure generally relates to work vehicles and, more particularly, to systems for controlling the torsional output of a hydrostatic transmission of a work vehicle, such as when reduced contact between the ground and one of the wheels of the vehicle.

BACKGROUND

Some agricultural work vehicles, such as tractors, sprayers, harvesters, and/or the like, use hydrostatic transmissions to transmit power from the engines to the wheels. In certain configurations, a hydrostatic transmission includes a hydraulic pump, a first hydraulic motor coupled to one wheel, and a second hydraulic motor coupled to another wheel. In this regard, the pump is driven by the engine, thereby generating a pressurized fluid flow within the transmission. A portion of the pressurized fluid flow is delivered to each motor, thereby driving the associated wheel.

As an agricultural work vehicle is moved across a field, the wheel coupled to one of the first or second hydraulic motors may fall into a divot or depression in the ground. In such instances, the wheel coupled to the other of the first or second hydraulic motors may be lifted off of the ground, thereby reducing the load on the associated motor. Since fluid flows along the path of least resistance, the portion of the pressurized fluid flow delivered to the motor associated with the lifted wheel increases, while the portion of the pressurized fluid flow delivered to the motor associated with the wheel in the divot decreases. As such, the decreased volume of fluid received by such motor may reduce its torsional output such that the associated wheel becomes stuck in the divot.

Accordingly, an improved system for controlling the torsional output of a hydrostatic transmission of a work vehicle would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for controlling the torsional output of a hydrostatic transmission of a work vehicle. The system may include first and second hydraulic motors and a pump configured to supply fluid to the first and second hydraulic motors. The system may also include a hydrostatic circuit provided between the pump and the first and second hydraulic motors, with the hydrostatic circuit including a first fluid conduit fluidly coupling the pump to the first hydraulic motor and a second fluid conduit fluidly coupling the pump to the second hydraulic motor. Furthermore, the system may include a pilot-operated first valve provided in association with the first fluid conduit, with the first valve configured to be actuated from an opened position to a closed position to occlude fluid flow through the first fluid conduit from the pump to the first hydraulic motor when a fluid pressure within the first fluid conduit at a location downstream of the first valve drops below a first pressure threshold. Moreover, the system may include a pilot-operated second valve provided in association with the second fluid conduit, with the second valve configured to be actuated from an opened position to a closed position to occlude fluid flow through the second fluid conduit from the pump to the second hydraulic motor when a fluid pressure within the second fluid conduit at a location downstream of the second valve drops below a second pressure threshold. As such, when one of the first valve or the second valve is actuated to the closed position due to a drop in the downstream fluid pressure below the associated pressure threshold, an increased flow of fluid is delivered through the other of the first valve or the second valve to increase a torsional output of the associated hydraulic motor.

In another aspect, the present subject matter is directed to a work vehicle, including first and second wheels, a first hydraulic motor configured to rotationally drive the first wheel, and a second hydraulic motor configured to rotationally drive the second wheel. The work vehicle may also include a pump configured to supply fluid to the first and second hydraulic motors and an engine configured to drive the pump. The work vehicle may further include a hydrostatic circuit provided between the pump and the first and second hydraulic motors, with the hydrostatic circuit including a first fluid conduit fluidly coupling the pump to the first hydraulic motor and a second fluid conduit fluidly coupling the pump to the second hydraulic motor. Moreover, the work vehicle may include a pilot-operated first valve provided in association with the first fluid conduit, with the first valve configured to be actuated from an opened position to a closed position to occlude fluid flow through the first fluid conduit from the pump to the first hydraulic motor when a fluid pressure within the first fluid conduit at a location downstream of the first valve drops below a first pressure threshold. Additionally, the work vehicle may include a pilot-operated second valve provided in association with the second fluid conduit, with the second valve configured to be actuated from an opened position to a closed position to occlude fluid flow through the second fluid conduit from the pump to the second hydraulic motor when a fluid pressure within the second fluid conduit at a location downstream of the second valve drops below a second pressure threshold. As such, when reduced contact between the ground and one of the first wheel and the ground or the second wheel occurs, the associated valve is actuated to the closed position due to a drop in the downstream fluid pressure below the associated pressure threshold such that an increased flow of fluid is delivered through the other of the first valve or the second valve to increase a torque applied to the other of the first wheel or the second wheel.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
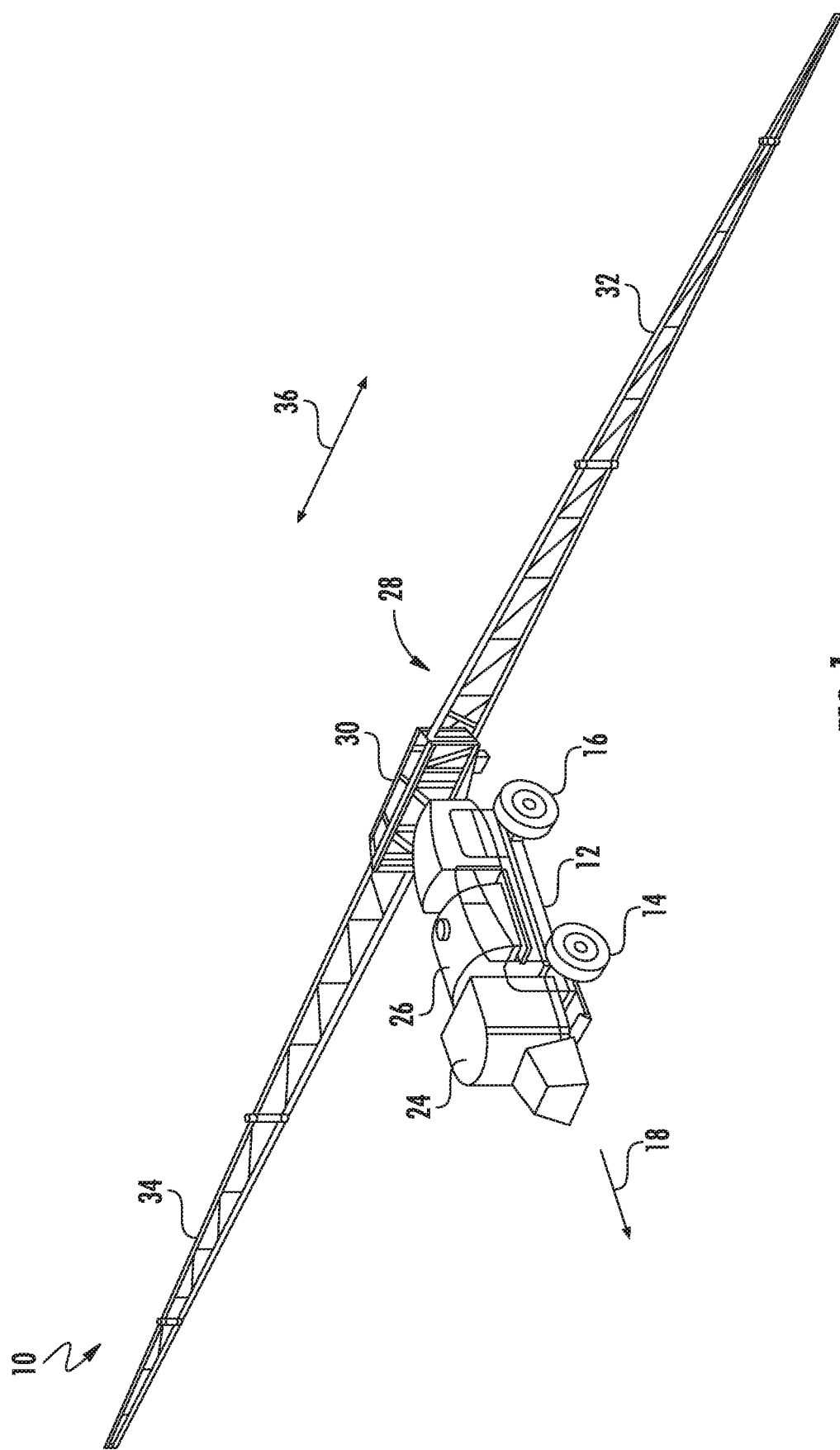
FIG. 1 illustrates a perspective view of one embodiment of a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems for controlling the torsional output of a hydrostatic transmission of a work vehicle. Specifically, in several embodiments, the system may include a pump configured to be rotationally driven by an engine of the vehicle. The system may also include first and second hydraulic motors that are configured to rotationally drive first and second wheels of the vehicle, respectively. Furthermore, a hydrostatic circuit may be configured to fluidly couple the pump and the first and second hydraulic motors. For example, in one embodiment, a first fluid conduit of the hydrostatic circuit may be configured to deliver a fluid flow from the pump to the first hydraulic motor, thereby driving the first hydraulic motor and the first wheel. Similarly, a second fluid conduit of the hydrostatic circuit may be configured to deliver a fluid flow from the pump to the second hydraulic motor, thereby driving the second hydraulic motor and the second wheel. Thus, the system may generally act to fluidly transmit power from the engine of the vehicle to its wheels.

In accordance with aspects of the present subject matter, the disclosed system may be configured to increase the torsional output of one of the first or second hydraulic motors when the load on the other of the first or second hydraulic motors decreases. As such, the system may include one or more components that permit adjustment of the distribution of the fluid flow within the hydrostatic circuit between the first and second hydraulic motors. For example, in several embodiments, a pilot-operated first valve may be configured to be actuated from an opened position to a closed position to occlude fluid flow through the first fluid conduit to the first hydraulic motor when the pressure within the first fluid conduit at a location downstream of the first valve (e.g., at an inlet of the first hydraulic motor) drops below a first pressure threshold. Similarly, a pilot-operated second valve provided may be configured to be actuated from an opened position to a closed position to occlude fluid flow through the second fluid conduit to the second hydraulic motor when the pressure within such fluid conduit at a location downstream of the second valve (e.g., at an inlet of the second hydraulic motor) drops below a second pressure threshold.

As indicated above, when one of the first or second wheels of the vehicle falls into a divot or other depression within a field across which the vehicle is moved, the other of the first or second wheels may be lifted off of the ground. In such instances, the load on the hydraulic motor associated with the lifted wheel may decrease significantly. Such a reduced load may, in turn, cause the pressure within the associated fluid conduit to drop below the associated pressure threshold, thereby actuating the associated valve to the closed position. When one of the first or second valves is at the closed position, an increased flow of fluid may delivered through the other of the first or second valves to increase a torsional output of the associated hydraulic motor. Such increased torsional output may provide sufficient force to remove the wheel from the divot, thereby maintaining movement of the vehicle across the field.

It should be appreciated that the disclosed system may be configured to provide a passive or fluid-actuated differential lock to the hydrostatic transmission of the work vehicle. As indicated above, the first and/or second valves may be fluid-actuated in a manner than redirects or redistributes fluid flow within the hydrostatic circuit when one of the first or second wheels is lifted off of the ground. Such redistribution of fluid flow acts as a fluid differential lock to prevent all or substantially all of the fluid flow within the hydrostatic circuit from flowing to the hydraulic motor associated with the lifted wheel. That is, additional fluid flow may be provided to the hydraulic motor associated with the wheel stuck in the divot such that the wheel stuck in the divot is driven despite the decreased load on the lifted wheel. In this regard, the disclosed system may operate in a manner analogous to a locking differential to prevent all torque from being sent to a single wheel (e.g., the lifted wheel). Furthermore, it should be appreciated that the differential lock of the disclosed system may be passive and, thus, not require electrically-operated actuators (e.g., solenoid valves).

Figure 2:
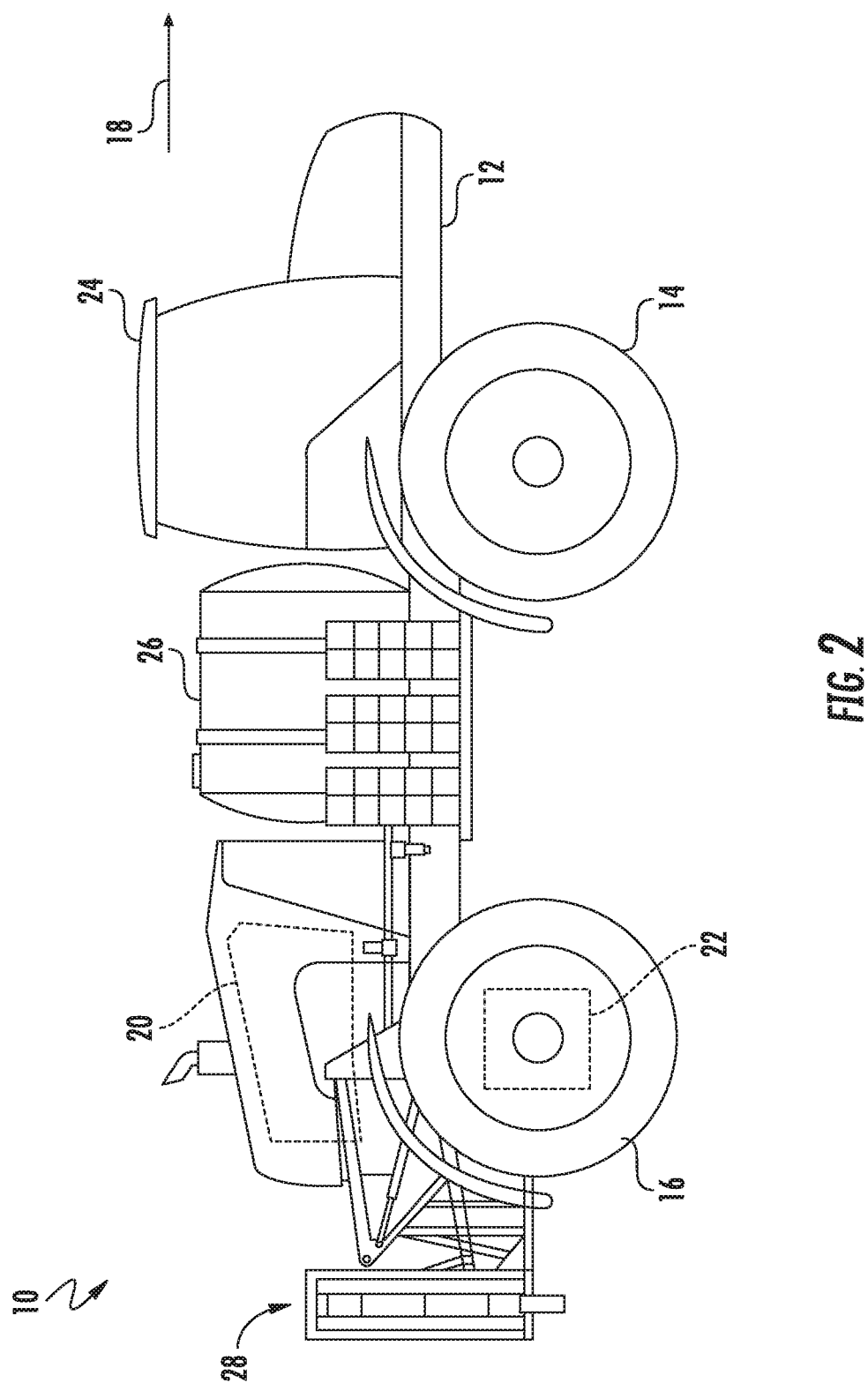
FIG. 2 illustrates a side view of the work vehicle shown in FIG. 1, particularly illustrating various components thereof in accordance with aspects of the present subject matter.

Referring now to the drawings, FIGS. 1 and 2 illustrate differing views of one embodiment of a work vehicle 10 in accordance with aspects of the present subject matter. Specifically, FIG. 1 illustrates a perspective view of the work vehicle 10. Additionally, FIG. 2 illustrates a side view of the work vehicle 10, particularly illustrating various components of the work vehicle 10. In the illustrated embodiment, the work vehicle 10 is configured as a self-propelled agricultural sprayer. However, it should be appreciated that, in alternative embodiments, the work vehicle 10 may be configured as any other suitable work vehicle that employs a hydrostatic transmission, such as various other agricultural vehicles (e.g., tractors, harvesters, etc.), earth-moving vehicles, loaders, and/or various other off-road vehicles.

As shown in FIGS. 1 and 2, the work vehicle 10 may include a frame or chassis 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the vehicle 10 relative to the ground and move the vehicle 10 in a direction of travel (e.g., as indicated by arrow 18 in FIG. 1) across a field. In this regard, the vehicle 10 may include an engine 20 and a hydrostatic transmission 22 configured to transmit power from the engine 20 to the wheels 14, 16. Furthermore, the frame 12 may also support an operator's cab 24 and a tank 26 that is configured to store or hold an agricultural substance, such as a pesticide, a fungicide, a rodenticide, a fertilizer, a nutrient, and/or the like. Additionally, the vehicle 10 may include a boom assembly 28 mounted on the frame 12. As shown, in one embodiment, the boom assembly 28 may include a center boom 30 and a pair of wing booms 32, 34 extending outwardly from the center boom 30 along a lateral direction 36, with the lateral direction 36 extending generally perpendicular the direction of travel 18. As is generally understood, a plurality of nozzles (not shown) mounted on the boom assembly 28 may be configured to dispense the agricultural substance stored in the tank 26 onto the underlying plants and/or soil. However, it should be appreciated that, in alternative embodiments, the boom assembly 28 may include any other suitable number and/or configuration of boom sections, such as more or fewer than three boom sections. Furthermore, it should be appreciated that, in further embodiments, the front wheels 14 of the vehicle 10 may be driven in addition to or in lieu of the rear wheels 16.

Figure 3:
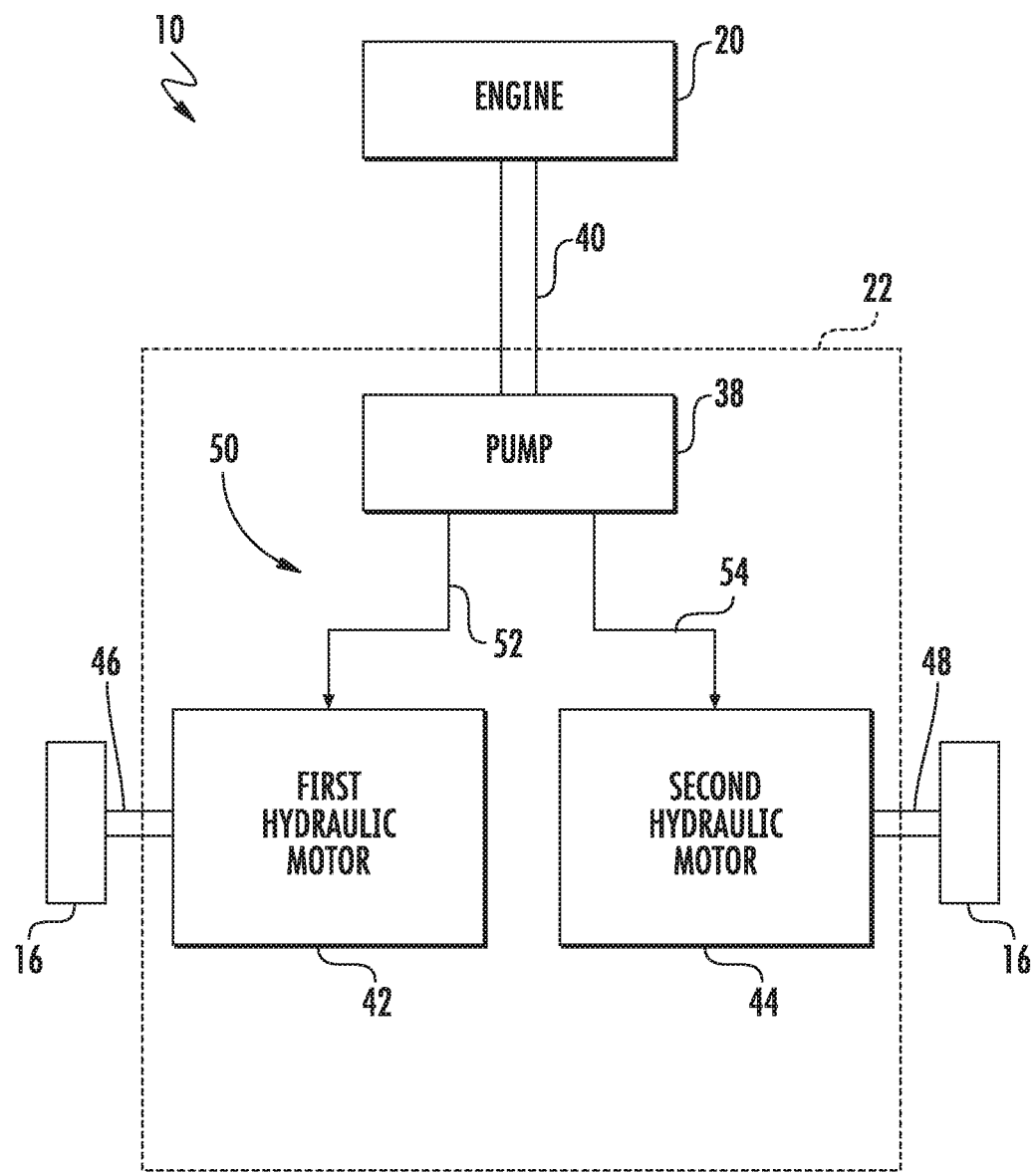
FIG. 3 illustrates a schematic view of various components of the work vehicle shown in FIGS. 1 and 2, particularly illustrating a hydrostatic transmission of the work vehicle in accordance with aspects of the present subject matter.

Referring now to FIG. 3, a schematic view of various components of the work vehicle 10 is illustrated in accordance with aspects of the present subject matter. Specifically, in several embodiments, the hydrostatic transmission 22 may include a pump 38 configured to be rotationally driven by the engine 22, such as via a drive shaft 40. The hydrostatic transmission 22 may also include first and second hydraulic motors 42, 44. As such, a first hydraulic motor 42 may be configured to rotationally drive one of the wheels 16 (e.g., via a first axle segment 46), while a second hydraulic motor 44 may be configured to rotationally drive the other of the wheels 16 (e.g., via a second axle segment 48). Moreover, the hydrostatic transmission 22 may include a hydrostatic circuit 50. For example, in one embodiment, the hydrostatic circuit 50 may include a first fluid conduit 52 configured to fluidly couple the pump 38 to the first hydraulic motor 42 and a second fluid conduit 54 configured to fluidly couple the pump 38 to the second hydraulic motor 44.

As indicated above, the hydrostatic transmission 22 may be configured to transmit power generated by the engine 20 to the wheels 16. More specifically, as is generally understood, the engine 20 may be configured to combust or otherwise burn a mixture of air and fuel so as to rotationally drive the drive shaft 40. The driveshaft 40 may, in turn, rotationally drive the pump 38 in a manner that generates a pressurized flow of a fluid (e.g., hydraulic oil) within the hydrostatic circuit 50. In this regard, the first fluid conduit 52 may deliver a first portion of the pressurized fluid flow to the first hydraulic motor 42, thereby rotationally driving the first hydraulic motor 42 and the associated wheel 16. Similarly, the second fluid conduit 54 may deliver a second portion of the pressurized fluid flow to the second hydraulic motor 44, thereby rotationally driving the second hydraulic motor 44 and the associated wheel 16. As will be described below, various valves may be provided in association with the hydrostatic circuit 52 to adjust the fluid flow through the hydrostatic circuit 50, thereby controlling the torsional output of the first and second hydraulic motors 42, 44.

Figure 4:
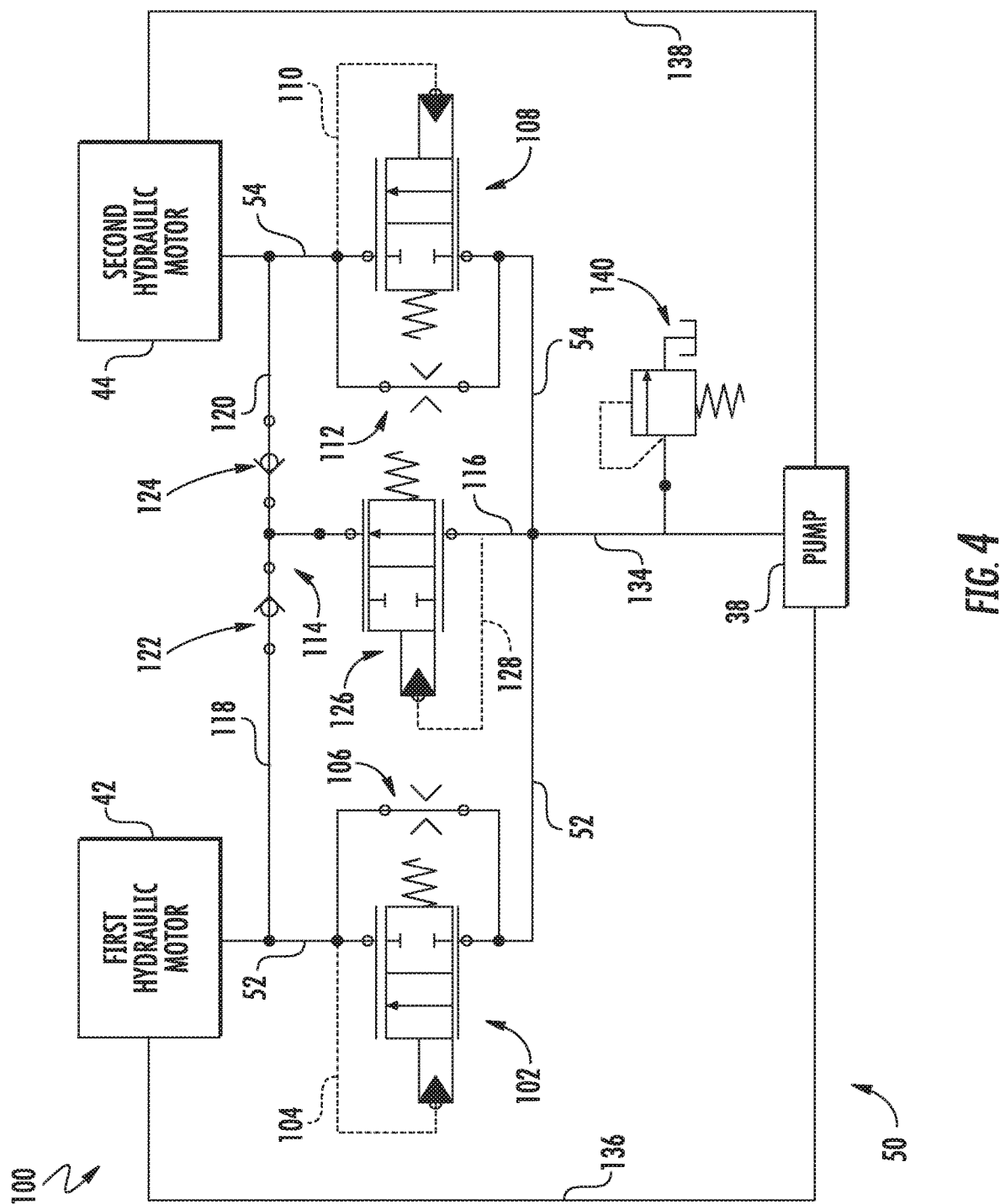
FIG. 4 illustrates a schematic view of one embodiment of a system for controlling the torsional output of a hydrostatic transmission of a work vehicle in accordance with aspects of the present subject matter.

Referring now to FIG. 4, a perspective view of one embodiment of a system 100 for controlling the torsional output of a hydrostatic transmission of a work vehicle is illustrated in accordance with aspects of the present subject matter. In general, the system 100 will be described herein with reference to the work vehicle 10 described above with reference to FIGS. 1-3. However, it should be appreciated by those of ordinary skill in the art that the disclosed system 100 may generally be utilized with work vehicles having any other suitable vehicle configuration.

As shown in FIG. 4, in several embodiments, the system 100 may include a pilot-operated first valve 102 configured to selectively occlude fluid flow through the first fluid conduit 52 based on the pressure within the first fluid conduit 52. Specifically, as shown, the first valve 102 may be provided in association with the first fluid conduit 52, such as in series with the first fluid conduit 52. In this regard, the first valve 102 may be configured to be actuated between an opened position at which fluid flow through the first valve 102 is permitted and a closed position at which fluid flow through the first valve 102 is occluded. Furthermore, the first valve 102 may be configured to receive a first pilot fluid flow (e.g., as indicated by dashed arrow 104 in FIG. 4) bled from a portion of the first fluid conduit 52 located downstream of the first valve 102. For example, in one embodiment, the first pilot fluid flow 104 may be bled from a portion of the first fluid conduit 52 located adjacent to an inlet of the first hydraulic motor 42. As such, the pressure of the first pilot fluid flow 104 may be the same as or similar to the pressure within the portion of the first fluid conduit 52 located downstream of the first valve 102 (e.g., the pressure of the fluid being supplied to the first hydraulic motor 42). When the pressure of the first pilot fluid flow 104 falls below a first pressure threshold, a suitable component(s) of the first valve 102 (e.g., a diaphragm(s), a spring(s), and/or the like) may be actuated in a manner that causes the first valve 102 to be actuated from the opened position to the closed position, thereby occluding fluid flow through the first valve 102. Conversely, when the pressure of the first pilot fluid flow 104 exceeds the first pressure threshold, the first valve 102 may be actuated from the closed position to the opened position, thereby permitting fluid flow through the first valve 102.

In one embodiment, the system 100 may include a first flow restrictor 106 configured to provide a reduced or bleed flow of fluid to the first hydraulic motor 42 when the first valve 102 is at the closed position. Specifically, as shown, the first flow restrictor 106 may be provided in association with the first fluid conduit 52 and fluidly coupled to the first valve 102 in parallel. As such, the first flow restrictor 106 may be configured to permit fluid to bypass the first valve 102 when the first valve 102 is at the closed position. In this regard, a bleed flow of fluid from the portion of the first fluid conduit 52 upstream of the first valve 102 may flow through the first flow restrictor 106 and into the portion of the first fluid conduit 52 downstream of the first valve 102 for delivery to the first hydraulic motor 42. As will be described below, such bleed fluid flow may prevent the operation of the first hydraulic motor 42 from halting when the first valve 102 is at the closed position. It should be appreciated that the first flow restrictor 106 may define a smaller fluid passage extending therethrough than the first valve 102 such that the volume of the bleed fluid flow through the first flow restrictor 106 may generally be less than the volume of the fluid flow through the first valve 102 when the first valve 102 is at the opened position. As such, the first flow restrictor 106 may correspond to any suitable device(s) that allows a smaller volume of fluid to flow therethrough than the first valve 102, such as a suitable orifice plate.

Furthermore, in several embodiments, the system 100 may include a pilot-operated second valve 108 configured to selectively occlude fluid flow through the second fluid conduit 54 based on the pressure within the second fluid conduit 54. Specifically, as shown, the second valve 108 may be provided in association with the second fluid conduit 54, such as in series with the second fluid conduit 54. In this regard, the second valve 108 may be configured to be actuated between an opened position at which fluid flow through the second valve 108 is permitted and a closed position at which fluid flow through the second valve 108 is occluded. Furthermore, the second valve 108 may be configured to receive a second pilot fluid flow (e.g., as indicated by dashed arrow 110 in FIG. 4) bled from a portion of the second fluid conduit 54 located downstream of the second valve 108. For example, in one embodiment, the second pilot fluid flow 110 may be bled from a portion of the second fluid conduit 54 located adjacent to an inlet of the second hydraulic motor 44. As such, the pressure of the second pilot fluid flow 110 may be the same as or similar to the pressure within the portion of the second fluid conduit 54 located downstream of the second valve 108 (e.g., the pressure of the fluid being supplied to the second hydraulic motor 44). When the pressure of the second pilot fluid flow 108 falls below a second pressure threshold, a suitable component(s) of the second valve 108 (e.g., a diaphragm(s), a spring(s), and/or the like) may be actuated in a manner that causes the second valve 108 to be actuated from the opened position to the closed position, thereby occluding fluid flow through the second fluid conduit 54. Conversely, when the pressure of the second pilot fluid flow 110 exceeds the second pressure threshold, the second valve 108 may be actuated from the closed position to the opened position, thereby permitting fluid flow through the second fluid conduit 54.

Moreover, in one embodiment, the system 100 may include a second flow restrictor 112 configured to provide a reduced or bleed flow of fluid to the second hydraulic motor 44 when the second valve 108 is at the closed position. Specifically, as shown, the second flow restrictor 112 may be provided in association with the second fluid conduit 54 and fluidly coupled to the second valve 108 in parallel. As such, the second flow restrictor 112 may be configured to permit fluid to bypass the second valve 108 when the second valve 108 is at the closed position. In this regard, a bleed flow of fluid from the portion of the second fluid conduit 54 upstream of the second valve 108 may flow through the second flow restrictor 112 and into the portion of the second fluid conduit 54 downstream of the second valve 108 for delivery to the second hydraulic motor 44. As will be described below, such bleed fluid flow may prevent the operation of the second hydraulic motor 44 from halting when the second valve 108 is at the closed position. It should be appreciated that the second flow restrictor 112 may define a smaller fluid passage extending therethrough than the second valve 108 such that the volume of the bleed fluid flow through the second flow restrictor 112 is less than the volume of the fluid flow through the second valve 108 when the second valve 108 is at the opened position. As such, the second flow restrictor 112 may correspond to any suitable device(s) that allows a smaller volume of fluid to flow therethrough than the second valve 108, such as a suitable orifice plate.

Furthermore, a bypass fluid conduit 114 of the hydrostatic circuit 50 may fluidly couple the pump 38 to the first and second hydraulic motors 42, 44. Specifically, in one embodiment, the bypass fluid conduit 114 may include a main section 116 configured to be fluidly coupled to the pump 38. The bypass fluid conduit 114 may also include a first branch 118 configured to fluidly couple a downstream end of the main section 116 to the first hydraulic motor 42 and a second branch 120 configured to fluidly couple the downstream end of the main section 116 to the second hydraulic motor 44. For example, in the illustrated embodiment, the first and second branches 118, 120 are coupled to the first and second fluid conduits 52, 54 at locations downstream of the first and second valves 102, 108, respectively. Furthermore, first and second check valves 122, 124 may be provided in association with the first and second branches 118, 120, respectively. In this regard, the first check valve 122 may be configured to prevent fluid within the first fluid conduit 52 from flowing through the first branch 118 of the bypass fluid conduit 114 and into the main section 116 thereof. Similarly, the second check valve 124 may be configured to prevent fluid within the second fluid conduit 154 from flowing through the second branch 120 of the bypass fluid conduit 14 and into the main section 116 thereof. It should be appreciated that the bypass fluid conduit 114 may have any other suitable configuration that fluidly couples the pump 38 to the first and second hydraulic motors 42, 44. For example, in one embodiment, the first and second branches 118, 120 of the bypass fluid conduit 114 may be coupled directly to the first and second hydraulic motors 42, 44, respectively.

Additionally, in several embodiments, the system 100 may include a pilot-operated bypass valve 126 configured to selectively occlude fluid flow through the bypass fluid conduit 114 based on the pressure within the bypass fluid conduit 114. Specifically, as shown, the bypass valve 126 may be provided in association with the bypass fluid conduit 114, such as in series with main section 116 of the bypass fluid conduit 114. In this regard, the bypass valve 126 may be configured to be actuated between an opened position at which fluid flow through the bypass valve 126 is permitted and a closed position at which fluid flow through the bypass valve 126 is occluded. Furthermore, the bypass valve 126 may be configured to receive a bypass pilot fluid flow (e.g., as indicated by dashed arrow 128 in FIG. 4) bled from a portion of the bypass fluid conduit 114 located upstream of the bypass valve 126. For example, in one embodiment, the bypass pilot fluid flow 128 may be bled from a portion of the bypass fluid conduit 114 located adjacent to an outlet of the pump 38. As such, the pressure of the bypass pilot fluid flow 128 may be the same as or similar to the pressure within the portion of the bypass fluid conduit 114 located upstream of the bypass valve 126 (e.g., the pressure of the fluid discharged from the pump 38). When the pressure of the bypass pilot fluid flow 128 exceeds a bypass pressure threshold, a suitable component(s) of the bypass valve 126 (e.g., a diaphragm(s), a spring(s), and/or the like) may be actuated in a manner that causes the bypass valve 126 to be actuated from the opened position to the closed position, thereby occluding fluid flow through the bypass valve 126. Conversely, when the pressure of the bypass pilot fluid flow 128 falls below the bypass pressure threshold, the bypass valve 126 may be actuated from the closed position to the opened position, thereby permitting fluid flow through the bypass fluid conduit 114. Moreover, as shown, in one embodiment, the first, second, and bypass valves 102, 108, 126, may be fluidly coupled together in parallel.

It should be appreciated that the system 100 may include any other suitable components, such as one or more other components of the hydrostatic transmission 22. For example, in the embodiment illustrated in FIG. 4, the hydrostatic circuit 50 also includes a pump outlet conduit 134 configured to fluidly couple the pump 38 to the first, second, and bypass fluid conduits 52, 54, 114. Moreover, as shown, hydrostatic circuit 50 may further include a first return fluid conduit 136 configured to fluidly couple an outlet of the first hydraulic motor 42 to the pump 38 and a second return fluid conduit 138 configured to fluidly couple an outlet of the second hydraulic motor 44 to the pump 38.

Additionally, in one embodiment, the system may include a pressure relief valve 140 provided in association with the pump outlet conduit 134. As such, the pressure relief valve 140 may be configured to open when the pressure within the pump outlet fluid conduit 134 exceeds a relief pressure threshold. In this regard, when the pressure relief valve 140 is opened, fluid from the pump outlet fluid conduit 134 flows out of the hydrostatic circuit 50 (e.g., to a suitable reservoir or relief tank), thereby reducing the pressure within the hydrostatic circuit 50. However, it should be appreciated that, in alternative embodiments, the pressure relief valve 140 may be provided in association with any other fluid conduit of the hydrostatic circuit 50. Furthermore, it should be appreciated that the system 100 may include any other suitable fluid components, such as any other suitable fluid conduits of the hydrostatic circuit 50 or valves.

In general, the system 100 may be configured to provide pressurized fluid from the pump 38 to the first and second hydraulic motors 42, 44 to drive the wheels 16 of the vehicle 10. Specifically, when the pump 38 is driven by the engine 20, the pump 38 may discharge a flow of pressurized fluid into the hydrostatic circuit 50, such as into the pump outlet fluid conduit 134. When the operation of the pump 32 is initiated (e.g., the initial five to ten seconds of operation), the pressure within hydrostatic circuit 50 may generally be below the first, second, and bypass pressure thresholds. In such instances, the first and second valves 102, 108 may be maintained at their normal, spring-biased closed positions, while the bypass valve 126 may be maintained at its normal, spring-biased opened position. As such, the first and second valves 102, 108 may occlude fluid flow through the first and second fluid conduits 52, 54 (other than the associated bleed flows). Conversely, the bypass valve 126 may permit fluid flow through the bypass fluid conduit 114 to the first and second hydraulic motors 42, 44 in a manner that drives the first and second hydraulic motors 42, 44 and the associated wheels 16. After flowing through the first and second hydraulic pumps 42, 44, the fluid is returned to the pump 38 via the first and second return fluid conduits 136, 138.

After the initial operation of the pump 38, the pressure within the hydrostatic circuit 50 may increase such that the pressure may generally exceed the first, second, and bypass pressure thresholds. In such instances, the first and second valves 102, 108 may be actuated to their opened positions, while the bypass valve 126 may be actuated to its closed position. As such, the bypass valve 126 may occlude fluid flow through the bypass fluid conduit 114. Conversely, the first and second valves 102, 108 may permit fluid flow through the first and second fluid conduits 52, 54 to the first and second hydraulic motors 42, 44, respectively, in a manner that drives the first and second hydraulic motors 42, 44 and the associated wheels 16. After flowing through the first and second hydraulic pumps 42, 44, the fluid is returned to the pump 38 via the first and second return fluid conduits 136, 138. Additionally, in such instances, the first check valve 122 may prevent fluid from the first fluid conduit 52 from flowing through the bypass fluid conduit 114 to the second hydraulic motor 44. Similarly, the second check valve 124 may prevent fluid from the second fluid conduit 54 from flowing through the bypass fluid conduit 14 to the first hydraulic motor 42.

In several embodiments, the bypass pressure threshold may be greater than the first and second pressure thresholds, with the first and second pressure thresholds being the same. For example, in one embodiment, the bypass pressure threshold may be sixty bars and the first and second pressure thresholds may be fifty bars. In this regard, as the pressure in the hydrostatic circuit 50 increases after operation of the pump 38 is initiated, the first and second valves 102, 108 may be actuated to their opened positions before the bypass valve 126 is actuated to its closed position. However, it should be appreciated that, in alternative embodiments, the first, second, and bypass pressure thresholds may correspond to any other suitable pressure thresholds.

Furthermore, it should be appreciated that, with conventional hydrostatic transmission configurations, the proportion of fluid flow generated by a pump that is received by each of a pair of hydraulic motors may generally be inversely related to the load differential between the hydraulic motors. For example, when the load on both hydraulic motors is the same or substantially the same, fifty percent of the fluid flow generated by the pump may be delivered to the each hydraulic motor. However, when the load on the first hydraulic motor is greater than the load on the second hydraulic motor, a larger portion of fluid flow generated by the pump may be delivered to the second hydraulic motor. Conversely, when the load on the second hydraulic motor is greater than the load on the first hydraulic motor, a larger portion of the fluid flow generated by the pump may be delivered to the first hydraulic motor. Such a configuration may result in a reduced torsional output of the motor with the greater load. As will be described below, the system 100 disclosed herein may increase the torsional output of the motor with the greater load.

In accordance with aspects of the present subject matter, the system 100 may be configured increase the torsional output of the second hydraulic motor 44 when the load on the first hydraulic motor 42 decreases. As indicated above, when the wheel 16 associated with the second hydraulic motor 44 falls into a divot or other depression in the field, the wheel 16 associated with the first hydraulic actuator 42 may be lifted off of the ground. In such instances, the load on the first hydraulic motor 42 may decrease such that the pressure within the first fluid conduit 52 drops below the first pressure threshold. Thereafter, the first valve 102 may be actuated to the closed position, thereby occluding the flow of fluid through the first valve 102. As such, only the bleed flow is delivered to the first hydraulic motor 42 to prevent the operation of the first hydraulic motor 42 from halting. With the first valve 102 at the closed position, an increased flow of fluid is delivered through the second fluid conduit 54 and the second valve 108 to the second hydraulic motor 44, thereby increasing the torsional output of the second hydraulic motor 44. Such increased torsional output may provide sufficient force to remove the associated wheel 16 from the divot, thereby maintaining movement of the vehicle 10 across the field. Once the wheel 16 is removed from the divot, the lifted wheel 16 may regain traction with the ground, thereby increasing the load on the first hydraulic motor 42. In such instances, the bleed flow may continue to be delivered to the first hydraulic motor 42, thereby increasing the pressure within the portion of the first fluid conduit 52 downstream of the first valve 102. When such pressure exceeds the first pressure threshold, the first valve 102 is actuated from the closed position to the opened position such that fluid flow is delivered to the first hydraulic motor 42 through the first valve 102.

Similarly, the system 100 may be configured increase the torsional output of the first hydraulic motor 42 when the load on the second hydraulic motor 44 decreases. As indicated above, when the wheel 16 associated with the first hydraulic motor 42 falls into a divot or other depression in the field, the wheel 16 associated with the second hydraulic motor 44 may be lifted off of the ground. In such instances, the load on the second hydraulic motor 44 may decrease such that the pressure within the second fluid conduit 54 drops below the first pressure threshold. Thereafter, the second valve 108 may be actuated to the closed position, thereby occluding the flow of fluid through the second valve 108. As such, only the bleed flow is delivered to the second hydraulic motor 44 to prevent the operation of the second hydraulic motor 44 from halting. With the second valve 108 at the closed position, an increased flow of fluid is delivered through the first fluid conduit 52 and the first valve 102 to the first hydraulic 42, thereby increasing the torsional output of the first hydraulic motor 42. Such increased torsional output may provide sufficient force to remove the wheel 16 from the divot, thereby maintaining movement of the vehicle 10 across the field. Once the wheel 16 is removed from the divot, the lifted wheel 16 may regain traction with the ground, thereby increasing the load on the second hydraulic motor 44. In such instances, the bleed flow may continue to be delivered to the second hydraulic motor 44, thereby increasing the pressure within the portion of the second fluid conduit 54 downstream of the second valve 108. When such pressure exceeds the second pressure threshold, the second valve 108 is actuated from the closed position to the opened position such that fluid flow is delivered to the second hydraulic motor 44 through the second valve 108.

It should be appreciated that, when one of the first or second valves 102, 108 is actuated to the closed position due to a drop in the downstream fluid pressure below the associated pressure threshold, the pressure of the fluid flow generated by the pump 38 may remain constant. That is, the increased flow of fluid delivered to the other of the first or second valves 102, 108 may be generated by a redistribution of the fluid flow through the hydrostatic circuit 50, not by an increase in the fluid flow therethrough. As such, the bypass valve 126 may remain at the closed position so as to occlude flow through the bypass fluid conduit 114 as the increased flow of fluid is delivered through the other of the first or second valves 102, 108.

Furthermore, it should be appreciated that the system may be configured to provide a passive or fluid-actuated differential lock to the hydrostatic transmission 22. As indicated above, the first valve 102 may be fluid-actuated in a manner than redirects or redistributes fluid flow within the hydrostatic circuit 50 when the wheel 16 associated with the first hydraulic motor 42 is lifted off of the ground, thereby preventing all or substantially all of the fluid flow within the hydrostatic circuit 50 from flowing to the first hydraulic motor 42. Similarly, the second valve 108 may be fluid-actuated in a manner than redirects or redistributes fluid flow within the hydrostatic circuit 50 when the wheel 16 associated with the second hydraulic motor 44 is lifted off of the ground, thereby preventing all or substantially all of the fluid flow within the hydrostatic circuit 50 from flowing to the second hydraulic motor 44. As such, additional fluid flow may be provided to the hydraulic motor 42, 44 associated with the wheel 16 stuck in the divot such that the wheel 16 stuck in the divot is driven despite the decreased load on the lifted wheel 16. In this regard, the disclosed system 100 may operate in a manner analogous to a locking differential to prevent all torque from being sent to a single wheel 16 (e.g., the lifted wheel). Moreover, the differential lock feature of the system 100 may be passive and, thus, not require electrically-operated actuators (e.g., solenoid valves).

Additionally, in several embodiments, the bypass valve 126 may be actuated to the opened position when the vehicle 10 travels downhill. In general, the vehicle 10 may be traveling downhill when the elevation of the ground across which the vehicle 10 is travelling decreases along its direction of travel 12. Specifically, when the vehicle 10 is traveling downhill, the pressure within the portions of the hydrostatic circuit 50 upstream of the first, second, and bypass valves 102, 108, 126 may be less than the pressure within the portions of the hydrostatic circuit 50 downstream from such components 102, 108, 126. In certain instances, the pressure within the bypass fluid conduit 114 at a location upstream of the bypass valve 126 may drop below the bypass pressure threshold such that the bypass valve 126 may be actuated from the closed position to the opened position. Thereafter, fluid flow from the pump 38 may be delivered through the bypass fluid conduit 114 to the first and second hydraulic motors 42, 44.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling the torsional output of a hydrostatic transmission of a work vehicle, the system comprising:
   first and second hydraulic motors;
   a pump configured to supply fluid to the first and second hydraulic motors;
   a hydrostatic circuit provided between the pump and the first and second hydraulic motors, the hydrostatic circuit including a first fluid conduit fluidly coupling the pump to the first hydraulic motor and a second fluid conduit fluidly coupling the pump to the second hydraulic motor;
   a pilot-operated first valve provided in association with the first fluid conduit, the first valve configured to be actuated from an opened position to a closed position to occlude fluid flow through the first fluid conduit from the pump to the first hydraulic motor when a fluid pressure within the first fluid conduit at a location downstream of the first valve drops below a first pressure threshold; and
   a pilot-operated second valve provided in association with the second fluid conduit, the second valve configured to be actuated from an opened position to a closed position to occlude fluid flow through the second fluid conduit from the pump to the second hydraulic motor when a fluid pressure within the second fluid conduit at a location downstream of the second valve drops below a second pressure threshold,
   wherein, when one of the first valve or the second valve is actuated to the closed position due to a drop in the downstream fluid pressure below the associated pressure threshold, an increased flow of fluid is delivered through the other of the first valve or the second valve to increase a torsional output of the associated hydraulic motor.

2. The system of claim 1, further comprising:
   a first flow restrictor provided in association with the first fluid conduit, the first flow restrictor fluidly coupled in parallel with the first valve to permit fluid to bypass the first valve when the first valve is at the closed position; and a second flow restrictor provided in association with the second fluid conduit, the second flow restrictor fluidly coupled in parallel with the second valve to permit fluid to bypass the second valve when the second valve is at the closed position, wherein, when one of the first valve or the second valve is actuated to the closed position due to a drop in the downstream fluid pressure below the associated pressure threshold, a bleed flow of fluid is delivered through the associated flow restrictor to the associated hydraulic motor.

3. The system of claim 1, wherein the hydrostatic circuit includes a bypass fluid conduit fluidly coupling the pump to the first and second hydraulic motors, the system further comprising:

a pilot-operated bypass valve provided in association with the bypass fluid conduit, the bypass valve configured to be actuated from a closed position to an opened position to permit fluid flow through the bypass fluid conduit from the pump to the first and second hydraulic motors when a fluid pressure within the bypass fluid conduit at a location upstream of the bypass valve falls below a bypass pressure threshold, wherein, when operation of the pump is initiated, the bypass valve is at the opened position to deliver fluid from the pump through the bypass fluid conduit to the first and second hydraulic motors.

4. The system of claim 3, wherein a pressure of the fluid flow generated by the pump remains constant when the one of the first valve or the second valve is actuated to the closed position due to the drop in the downstream fluid pressure below the associated pressure threshold.

5. The system of claim 3, wherein, when the one of the first valve or the second valve is actuated to the closed position due to the drop in the downstream fluid pressure below the associated pressure threshold, the bypass valve remains at the closed position as the increased flow of fluid is delivered through the other of the first valve or the second valve.

6. The system of claim 3, wherein the bypass fluid conduit includes a first branch fluidly coupling the bypass valve to the first hydraulic motor and a second branch fluidly coupling the bypass valve to the second hydraulic motor, the system further comprising:

a first check valve provided in association with the first branch, the first check valve being configured to prevent fluid from the first fluid conduit through the bypass fluid conduit to the second hydraulic motor; and a second check valve provided in association with the second branch, the second check valve being configured to prevent fluid from the second fluid conduit through the bypass fluid conduit to the first hydraulic motor.

7. The system of claim 3, wherein the first, second, and bypass valves are fluidly coupled together in parallel.

8. The system of claim 3, wherein the bypass pressure threshold is greater than the first and second pressure thresholds.

9. The system of claim 1, wherein:

the first hydraulic motor is coupled to a first wheel of the work vehicle and the second hydraulic motor is coupled to a second wheel of the work vehicle; and when reduced contact between the ground and one of the first wheel or the second wheel occurs, an operation of one of the first valve or the second valve is configured to provide a fluid-actuated differential lock to the hydrostatic transmission.

10. A work vehicle, comprising:

first and second wheels;

a first hydraulic motor configured to rotationally drive the first wheel;

a second hydraulic motor configured to rotationally drive the second wheel;

a pump configured to supply fluid to the first and second hydraulic motors;

an engine configured to drive the pump;

a hydrostatic circuit provided between the pump and the first and second hydraulic motors, the hydrostatic circuit including a first fluid conduit fluidly coupling the pump to the first hydraulic motor and a second fluid conduit fluidly coupling the pump to the second hydraulic motor;

a pilot-operated first valve provided in association with the first fluid conduit, the first valve configured to be actuated from an opened position to a closed position to occlude fluid flow through the first fluid conduit from the pump to the first hydraulic motor when a fluid pressure within the first fluid conduit at a location downstream of the first valve drops below a first pressure threshold; and a pilot-operated second valve provided in association with the second fluid conduit, the second valve configured to be actuated from an opened position to a closed position to occlude fluid flow through the second fluid conduit from the pump to the second hydraulic motor when a fluid pressure within the second fluid conduit at a location downstream of the second valve drops below a second pressure threshold, wherein, when reduced contact between the ground and one of the first wheel and the ground or the second wheel occurs, the associated valve is actuated to the closed position due to a drop in the downstream fluid pressure below the associated pressure threshold such that an increased flow of fluid is delivered through the other of the first valve or the second valve to increase a torque applied to the other of the first wheel or the second wheel.

11. The work vehicle of claim 10, further comprising:

a first flow restrictor provided in association with the first fluid conduit, the first flow restrictor fluidly coupled in parallel with the first valve to permit fluid to bypass the first valve when the first valve is at the closed position; and a second flow restrictor provided in association with the second fluid conduit, the second flow restrictor fluidly coupled in parallel with the second valve to permit fluid to bypass the second valve when the second valve is at the closed position, wherein, when reduced contact between one of the first wheel and the ground or the second wheel and the ground occurs, a bleed flow of fluid is delivered through the associated flow restrictor to the associated hydraulic motor.

12. The work vehicle of claim 11, when increased contact between the ground and the one of the first wheel or the second wheel occurs after the associated valve is actuated to the closed position, the bleed flow provided to the associated motor increases the pressure downstream of the associated valve until the pressure exceeds the associated pressure threshold.

13. The work vehicle of claim 10, wherein the hydrostatic circuit includes a bypass fluid conduit fluidly coupling the pump to the first and second hydraulic motors, the system further comprising:
- a pilot-operated bypass valve provided in association with the bypass fluid conduit, the bypass valve configured to be actuated from a closed position to an opened position to permit fluid flow through the bypass fluid conduit from the pump to the first and second hydraulic motors when a fluid pressure within the bypass fluid conduit at a location upstream of the bypass valve falls below a bypass pressure threshold,
- wherein, when operation of the pump is initiated, the bypass valve is at the opened position to deliver fluid from the pump through the bypass fluid conduit to the first and second hydraulic motors.

14. The work vehicle of claim 13, wherein, when an elevation of the ground across which the work vehicle is travelling decreases along a direction of travel of the work vehicle, the bypass valve is actuated to the opened position due to a drop in the upstream fluid pressure below the associated pressure threshold such that fluid flow from the pump is delivered through the bypass fluid conduit to the first and second hydraulic motors.

15. The work vehicle of claim 13, wherein a pressure of the fluid flow generated by the pump remains constant when reduced contact between the ground and the one of the first wheel or the second wheel occurs.

16. The work vehicle of claim 13, wherein, when reduced contact between the one of the first wheel and the ground or the second wheel and the ground occurs, the bypass valve remains at the closed position as the increased flow of fluid is delivered through the other of the first valve or the second valve.

17. The work vehicle of claim 13, wherein the bypass fluid conduit includes a first branch fluidly coupling the bypass valve to the first hydraulic motor and a second branch fluidly coupling the bypass valve to the second hydraulic motor, the work vehicle further comprising:
- a first check valve provided in association with the first branch, the first check valve being configured to prevent fluid from the first fluid conduit through the bypass fluid conduit to the second hydraulic motor; and
- a second check valve provided in association with the second branch, the second check valve being configured to prevent fluid from the second fluid conduit through the bypass fluid conduit to the first hydraulic motor.

18. The work vehicle of claim 13, wherein the first, second, and bypass valves are fluidly coupled together in parallel.

19. The work vehicle of claim 13, wherein the bypass pressure threshold is greater than the first and second pressure thresholds.

* * * * *